(12) United States Patent
Dabrowski

(10) Patent No.: US 7,036,721 B2
(45) Date of Patent: *May 2, 2006

(54) METHOD AND APPARATUS FOR AUTONOMOUS VALIDATION OF ISSUED SCRIP MEDIA

(76) Inventor: Stanley P. Dabrowski, 2801 Deep Water Cir., Las Vegas, NV (US) 89117

( * ) Notice: Subject to any disclaimer, the term of this patent is extended or adjusted under 35 U.S.C. 154(b) by 0 days.

This patent is subject to a terminal disclaimer.

(21) Appl. No.: 10/985,856

(22) Filed: Nov. 10, 2004

(65) Prior Publication Data

US 2005/0096127 A1 May 5, 2005

Related U.S. Application Data

(63) Continuation of application No. 09/935,521, filed on Aug. 23, 2001, now Pat. No. 6,834,794.

(51) Int. Cl.
G06F 17/00 (2006.01)
G06F 7/08 (2006.01)

(52) U.S. Cl. ...................... 235/375; 235/381
(58) Field of Classification Search ............ 235/375, 235/381; 463/16–45
See application file for complete search history.

(56) References Cited

U.S. PATENT DOCUMENTS

| | | | |
|---|---|---|---|
| 4,880,237 A | 11/1989 | Kishishita |
| 5,007,627 A | 4/1991 | Giannetti et al. |
| 5,179,517 A | 1/1993 | Sarbin et al. |
| 5,239,165 A | 8/1993 | Novak |
| 5,251,738 A | 10/1993 | Dabrowski |
| 5,265,874 A | 11/1993 | Dickinson et al. |
| 5,290,033 A | 3/1994 | Bittner et al. |
| 5,350,168 A | 9/1994 | Sheridan |
| 5,371,345 A | 12/1994 | LeStrange et al. |
| 5,420,406 A | 5/1995 | Izawa et al. |
| 5,429,361 A | 7/1995 | Raven et al. |
| 5,470,079 A | 11/1995 | LeStrange et al. |
| 5,544,728 A | 8/1996 | Dabrowski |
| 5,557,086 A | 9/1996 | Schulze et al. |
| 5,577,959 A | 11/1996 | Takemoto et al. |
| 5,580,311 A | 12/1996 | Haste, III |
| 5,595,538 A | 1/1997 | Haste, III |
| 5,627,356 A | 5/1997 | Takemoto et al. |
| 5,692,743 A | 12/1997 | Yano et al. |
| 5,709,603 A | 1/1998 | Kaye |
| 5,772,510 A | 6/1998 | Roberts |
| 5,791,990 A | 8/1998 | Schroeder et al. |
| 5,818,026 A | 10/1998 | Melling et al. |
| 5,901,951 A | 5/1999 | Yamaguchi |
| 5,915,588 A | 6/1999 | Stoken et al. |
| 6,012,832 A | 1/2000 | Saunders et al. |
| 6,014,594 A | 1/2000 | Heidel et al. |
| 6,048,269 A | 4/2000 | Burns et al. |
| 6,048,271 A | 4/2000 | Barcelou |
| 6,056,289 A | 5/2000 | Clapper, Jr. |

(Continued)

FOREIGN PATENT DOCUMENTS

WO   WO 94/16781   8/1994

(Continued)

*Primary Examiner*—Thien M. Le
*Assistant Examiner*—April Taylor
(74) *Attorney, Agent, or Firm*—Gates & Cooper LLP

(57) ABSTRACT

A method, apparatus, and article of manufacture for autonomously validating issued scrip media is disclosed. In response to a cashout command, a cashout value is magnetically and visibly recorded on a re-recordable continuous magnetic media portion and a surface suitable for the application of print media, respectively.

48 Claims, 9 Drawing Sheets

U.S. PATENT DOCUMENTS

| | | |
|---|---|---|
| 6,098,837 A | 8/2000 | Izawa et al. |
| 6,110,044 A | 8/2000 | Stern |
| 6,113,492 A | 9/2000 | Walker et al. |
| 6,128,550 A | 10/2000 | Heidel et al. |
| 6,170,744 B1 | 1/2001 | Lee et al. |
| 6,253,119 B1 | 6/2001 | Dabrowski |
| 6,263,258 B1 | 7/2001 | Dabrowski |
| 6,280,326 B1 | 8/2001 | Saunders |
| 6,547,664 B1 * | 4/2003 | Saunders ............... 463/25 |
| 6,558,256 B1 * | 5/2003 | Saunders ............... 463/25 |
| 6,623,357 B1 | 9/2003 | Chowdhury |
| 6,650,427 B1 | 11/2003 | Brooks et al. |
| 2002/0160832 A1 | 10/2002 | Burns et al. |
| 2003/0166412 A1 | 9/2003 | Marcu |
| 2003/0171145 A1 | 9/2003 | Rowe |

FOREIGN PATENT DOCUMENTS

| | | |
|---|---|---|
| WO | WO 98/59311 | 12/1998 |
| WO | WO 99/22350 | 6/1999 |

\* cited by examiner

METHOD AND APPARATUS FOR AUTONOMOUS VALIDATION OF ISSUED SCRIP MEDIA

This application claims the benefit under 35 U.S.C. Section 120 of the following and commonly-assigned U.S. utility patent application(s), which is/are incorporated by reference herein:

This application is a continuation of application Ser. No. 09/935,521, filed Aug. 23, 2001 now U.S. Pat. No. 6,834,794, by Stanley P. Dabrowski, entitled "METHOD AND APPARATUS FOR AUTONOMOUS VALIDATION OF ISSUED SCRIP MEDIA".

BACKGROUND OF THE INVENTION

1. Field of the Invention

The present invention relates to systems and methods for managing currency transactions, and in particular, to a method and apparatus for issuing and accepting self-authenticating scrip media.

2. Description of the Related Art

Recent years have seen a rapid expansion of the gaming industry. Much of the income derived from such games is collected at gaming devices like slot machines and video poker games.

Revenue from such gaming devices can be increased in one of two ways: by increasing the number of transactions or by increasing the average wager per transaction. The number of transactions can be most easily increased simply by increasing the number of available machines. However, increasing the number of gaming devices can be a costly enterprise.

In the past, most gaming machines used coins as a medium of exchange. The machine accepted the wager in coin, and if the player was successful, paid winnings immediately from coin stored in the machine itself. While effective, such coin machines are expensive to maintain. Since the money taken in by the gaming device generally exceeds jackpots paid out, the accumulated money (in coin) must be removed from each machine on a periodic basis. This collection can be difficult, because coins can be heavy and unwieldy.

Recent years have seen a movement away from coin-only machines and a proliferation of gaming machines that also accept currency as a medium of exchange. In fact, currently, 60% or more of gaming machines can accept wagers in currency. Although they represent an improvement from the coin machines of the past, currency-accepting gaming machines have proved to be no panacea. Currency acceptors do not obviate the need to pay out winnings in coin. For example, if the player cashes out with $25.50 remaining in the payout account, the gaming device can only issue winnings in coin (in this case, 104 quarters). Since players will often terminate play at such times, the coinage paid out generally exceeds wager coinage entered into the machine, and a cache of coin in the gaming device must be maintained and frequently replenished.

Systems have been developed that can issue and accept scrip as a substitute for paper currency or coin. One example of such a system is disclosed in PCT publication WO 98/59311, which describes a Cashless Peripheral Device for a Gaming System, which publication is incorporated by reference. Such systems usually require that each of the gaming devices be communicatively coupled to a central computer. Typically, when the user cashes out, a unique key is either generated within the gaming device and transmitted to the central computer for storage (where it can be later accessed by other gaming machines) or the key is generated in the central computer and transmitted to the gaming machine issuing the scrip. The unique key is used to encrypt the cashout value and other information recorded on the scrip before it is issued to the user.

Although the foregoing systems can have several advantages, they require typically expensive computer network capabilities that can represent a considerable cost barrier. Further, although such systems can be made reasonably secure, there is the very real possibility that a hacker, through access to the computer network, can compromise the security of the system.

What is needed is a system and method for cashless gaming that uses tamper-resistant scrip instead of computer network for authentication purposes. The present invention satisfies that need.

SUMMARY OF THE INVENTION

To address the requirements described above, the present invention discloses a method, apparatus, and article of manufacture for dispensing pre-coded scrip.

The method comprises the steps of determining a cashout value in response to a cashout command, recording a visible manifestation representing information comprising the cashout value on a media, recording a magnetic manifestation representing the information on the media and dispensing the media from the first gaming machine.

In one embodiment, the apparatus comprises a self-authenticating media usable in transferring credits from a first gaming machine to a second gaming machine. The media comprises a bottom surface, suitable for application of print media, a heat-sensitive top surface, suitable for manifesting printed media by a thermal printer, a re-recordable continuous magnetic media portion, embedded within the media between the bottom surface and the top surface, the magnetic media portion suitable for recording, playing back, and erasing a continuously variable magnetic field by a magnetic head, wherein the magnetic media portion is substantially undetectable by reflective optical sensors and substantially detectable by densometric optical sensors.

In another embodiment, the apparatus comprises a printing device for applying printed media to a heat sensitive top surface of the self-authentication media, a processor, communicatively coupled to the printing device and a memory, a magnetic head, and a magnetic media subsystem communicatively coupled to the processor and the magnetic head, the magnetic media subsystem selectable configurable to authenticate currency via magnetic ink printed on the currency and to read a magnetic manifestation representing information comprising a cashout value on a re-recordable continuous magnetic media portion embedded within the self-authenticating media.

This system relies on coupons or scrip cards that are inherently worthless and self-authenticating. These coupons are activated and dispensed to the user when a payout is requested, and permanently deactivated when they are re-inserted into a gaming device.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
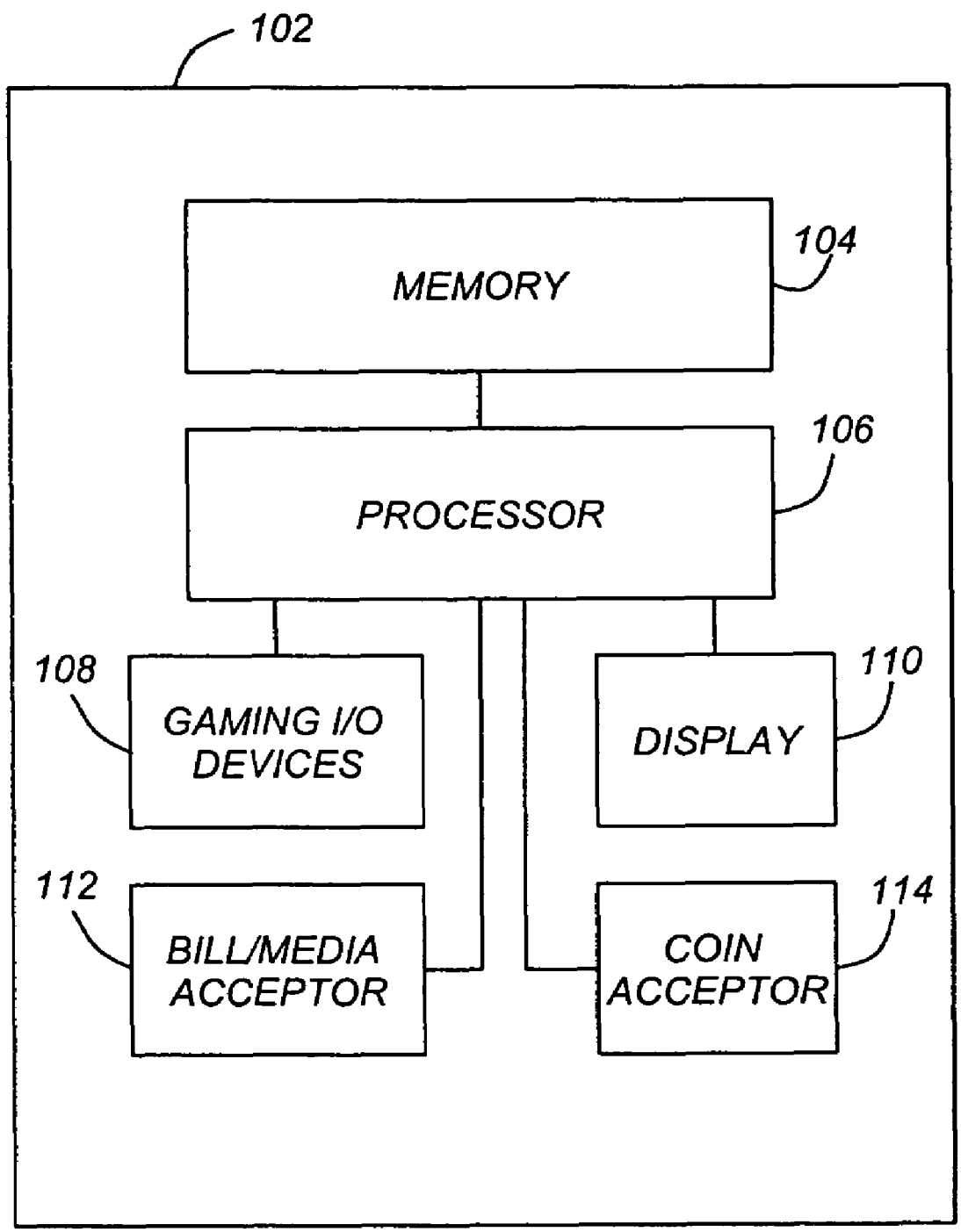
FIG. 1 is a functional block diagram of a gaming device.

FIG. 1 is a functional block diagram of a gaming device 102. The gaming device 102 comprises a memory 104 communicatively coupled to a processor 106. The memory 104 stores instructions that command the processor 106 to perform the functions of the gaming device 102.

The processor 106 is communicatively coupled to one or more gaming input/output (I/O) devices, including for example, wager buttons, game play buttons (such as hold and deal buttons) and the like. The processor 106 is also communicatively coupled to a display 110 for presenting the game play to the user.

The gaming machine 102 comprises a coin acceptor 114 for accepting coin in exchange for game credits and game play. The gaming device 102 also comprises a bill/media acceptor/dispenser (BMAD) 112. The BMAD is configured to accept and verify the authenticity of currency that is inserted into the gaming machine 102 to obtain game credits. The BMAD may comprise a device which only accepts currency, a device which accepts only scrip media, or a device which is capable of accepting both. An example of such a device is presented in U.S. Pat. No. 5,420,406, (hereinafter, the '406 patent) issued May 30, 1995 to Izawa et al., which is hereby incorporated by reference herein. The device of the '406 patent is a device which can accept both currency and scrip media with bar coded information. Another device that can accept both currency and coded information is described in U.S. Pat. No. 4,568,125, (hereinafter the '125 patent), issued to Kachi et al. on Apr. 14, 1987, which application is hereby incorporated by reference.

Figure 2:
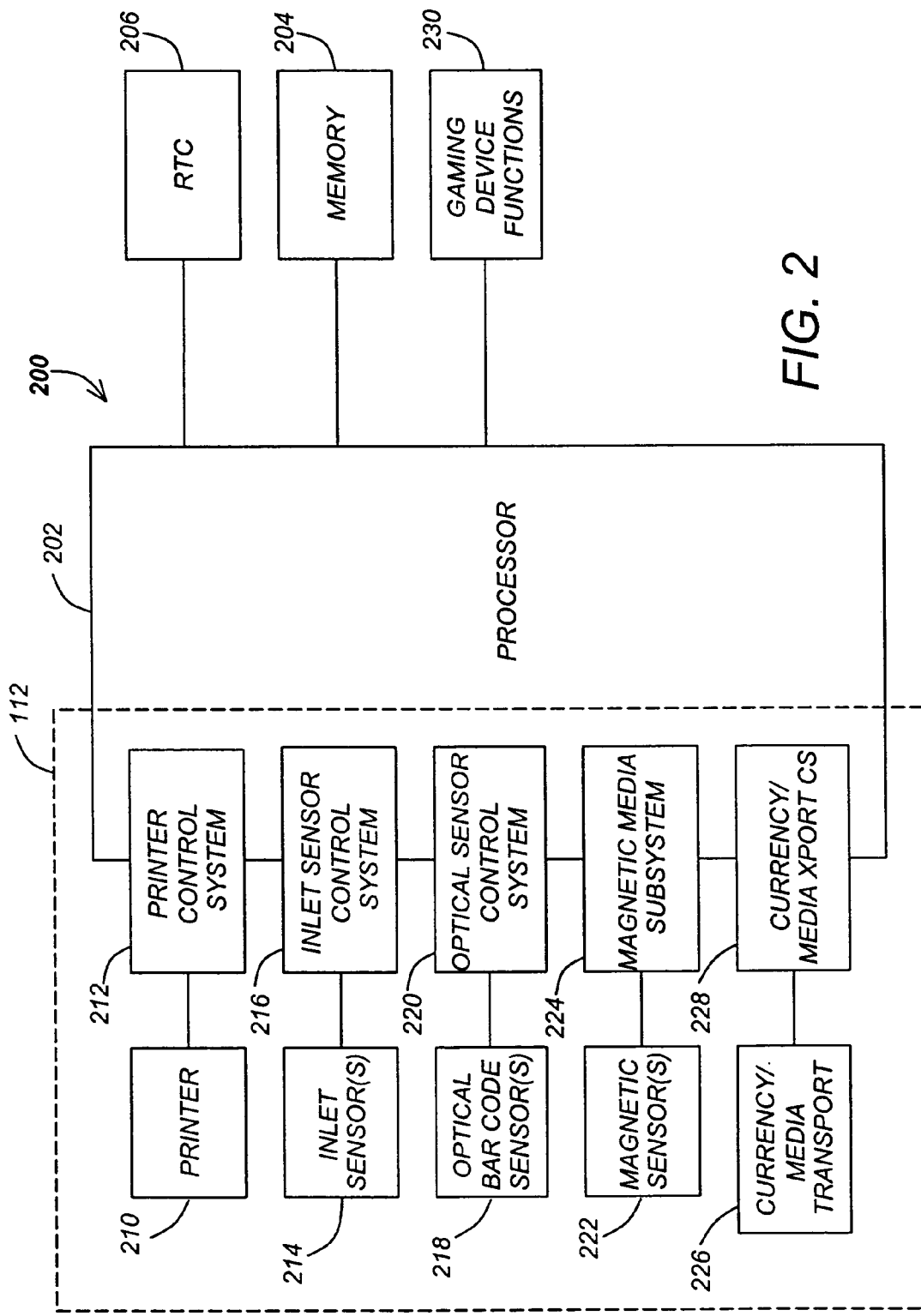
FIG. 2 is a block diagram of one embodiment of the present invention.

FIG. 2 is a block diagram of one embodiment of a media dispensing and receiving device 200. The media dispensing device 200 includes a processor 202 and a communicatively coupled memory 204 and real time clock 206. The memory 204, real time clock 206 and the processor 202 can be devices separate from the memory 104, and the processor 106 of the gaming device 102 presented in FIG. 1, or the functions of the memory 204, real time clock 206 and processor can be performed by the processor 106, the memory 104 of the gaming device 102 and/or other additional components. The media dispensing and receiving device 200 includes the BMAD 112 described in FIG. 1, and other elements 230 to perform gaming device functions.

The BMAD 112 includes a printer 210 operatively coupled to a printer control system 212, one or more inlet sensors 214 operatively coupled to an inlet sensor control system 216, one or more optical barcode sensors 218 operatively coupled to an optical sensor control system 220, one or more magnetic sensors 222 operatively coupled to a magnetic media subsystem 224, and a currency/media transport system 226 operatively coupled to a currency/media transport control system. In FIG. 2, the printer control system 212, the inlet control system 216, the optical sensor control system 220, the magnetic media subsystem, and the currency/media transport control system 228 are depicted as being partially within and without the processor 202. This indicates that the functions performed by these systems may be implemented partially in the processor 202 and partially in processor-external elements (such as mechanical devices or other electronics), completely within the processor 202, or completely external to the processor 202.

The printer 210 can be any device capable of printing information on media in the BMAD 112. In one embodiment, the printer 210 comprises a thermal print head that, thorough the heating of elements in the thermal print head, causes chemical changes in a media surface disposed adjacent thereto. The chemical changes are manifested as darker areas on the media surface, this producing a visible manifestation of information that is to be printed on the media surface. In one embodiment, the thermal print head remains stationary and the media itself is moved to print the information on the media, under control of the printer control system 212. In another embodiment, the thermal print head is moved across the media by the printer control system 212, which in this case may include a suitable implement such as a mechanism driven by a motor and a screw. The information printed on the media can be of many forms. In one embodiment, the visible manifestation of the information is a bar code or similar manifestation. The printer may also be an impact printer, laser printer, or any device capable of rendering visible manifestations of information on the media surface.

Inlet sensor(s) 214 provide information indicating when media has been inserted and/or removed from the BMAD 112. The inlet sensor control system 216 controls the inlet sensor(s) 214 as necessary, and passes information to and/or from the inlet sensors 214 to the processor 202. In one embodiment, the inlet sensors comprise optical sensors that determine if an opaque object is inserted into the BMAD 112. In another embodiment, the inlet sensors 214 can comprise a physical arm with an attached microswitch.

The optical bar code sensors 218 is a device capable of reading bar code or other information on the media in the BMAD 112 (such as a bar code printed by the printer 210 working with the printer control system 212). In one embodiment, the optical bar code sensors 218 comprise a stationary optical sensor that scans the media as the media is manipulated within the BMAD by the currency/media transport system 228. In another embodiment, the media remains substantially stationary when scanned, and the optical bar code sensors 218 are moved by a suitable mechanical assembly. In yet another embodiment, the optical bar code sensor 218 is capable of resolving the bar code printed on the media without relative motion between the optical bar code sensor and the media at all. This would include, for example a matrix of sensors of sufficient number to resolve the features of the bar code or a scanning (but stationary) sensor.

In one embodiment, the magnetic sensor(s) 222 include sensors that are ordinarily used in bill acceptors to sense the ferrous ink that is used in genuine U.S. currency.

The magnetic sensors 222 are operatively coupled to a magnetic media subsystem 224. The magnetic media subsystem 224 performs several functions. When currency is inserted into the BMAD 112, the magnetic media subsystem 224 activates and controls the magnetic sensors 222 to attempt to sense the ferrous ink on the inserted currency. The magnetic media subsystem accepts the data obtained from scanning the currency with the magnetic sensors 222 to determine if they have ferrous ink in the expected areas. This information is passed to the processor 202, which uses the information (as well as other information) to determine whether the inserted currency is authentic.

The magnetic media subsystem 224 also accepts data from the processor 202, and records this data in a continuously-variable magnetic field on a magnetic strip on a self-authenticating media. This function can be accomplished with a combination of software and hardware, or may be implemented in hardware alone. Similarly, when non-currency media is inserted into the BMAD 112, the magnetic media subsystem 224 scans continuously variable magnetic information on the media (that which was recorded by a similar BMAD 112 device) to determine if the inserted media is authentic.

Figure 3A:
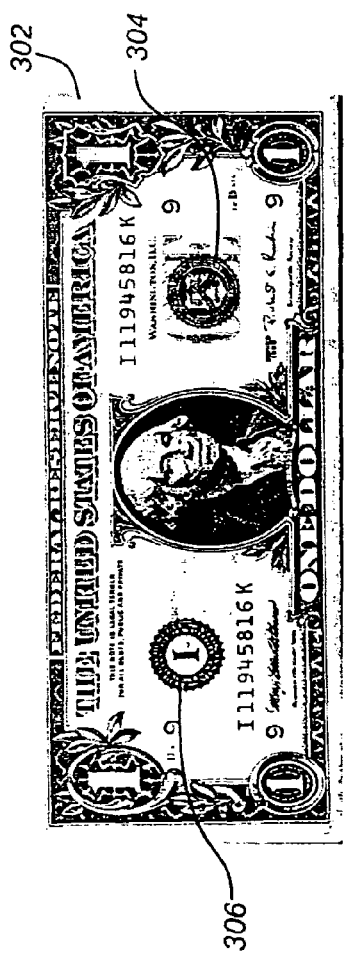
FIG. 3A to FIG. 3C are diagrams showing an embodiment of the self-authenticating media.

FIG. 3A is an illustration of U.S. currency 302 (in this case, a dollar bill). The currency 302 includes a first seal 304 and a second seal 306. The second seal 306 is printed with ferrous ink, and can therefore be sensed by the magnetic sensors 222 in the BMAD 112. The first seal 304 is printed in non-ferrous ink, and therefore, should not be sensed by the magnetic sensors 222.

Figure 3B:
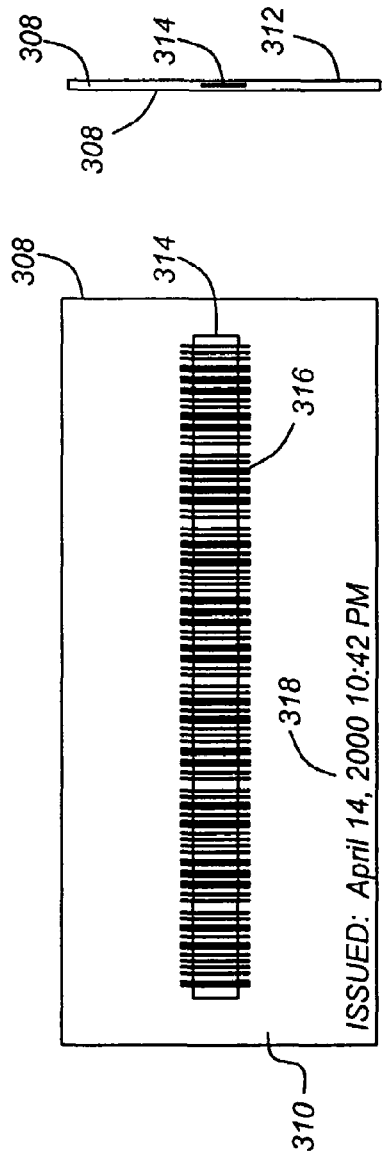
Figure 3C:
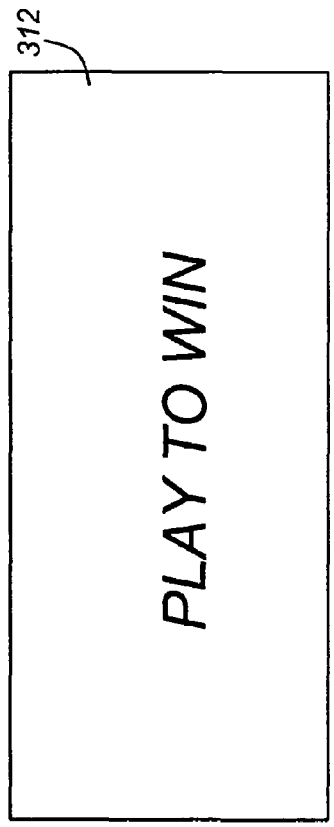

FIG. 3B-3C are illustrations of one embodiment of the self-authenticating media 308 (hereinafter alternately referred to simply as "media"). The media 308 comprises a bottom surface 312, which is suitable for the application of print media. In one embodiment of the invention, the pre-printed surface includes authenticating information that is difficult to reproduce or emulate, thus aiding the authentication of the media.

The media 308 also comprises a heat-sensitive top surface 310, which is suitable for manifesting printed media by a thermal printer such as the printer 210. Embedded within the media 308 between the bottom surface 312 and the top surface 310, is a re-recordable continuous magnetic media portion 314. The magnetic media portion 314 comprises a continuously variable magnetic manifestation representing information about the media that is suitable for recording, playing back, and erasing by, for example, one of the magnetic sensors 222. In one embodiment, the magnetic manifestation comprises a magnetic field. In one embodiment, the magnetic media portion 314 comprises a polyethelene stripe having magnetizable particles or a magnetic track.

The top surface 310 of the media 308 may also comprises a visible manifestation representing information that is recorded on the media. Since the magnetic media portion 314 is embedded within the media 308, the visible manifestation may be printed adjacent to the magnetic media portion 314. In the illustrated embodiment, the visible manifestation is a bar code 316, which is printed on a portion of the top surface of the media 308 adjacent to the magnetic strip. Other embodiments are also possible.

Also, in one embodiment of the present invention, the magnetic media portion is substantially undetectable by a reflective optical sensor, yet detectable by a densometric reflective optical sensor. Reflective optical sensors are intended to measure light reflecting off of the surface of the media, while densometric sensors measure light passing through the media itself.

Returning to FIG. 2, the BMAD 112 also comprises a currency/media transport system 226 and a currency/media transport control system 228. Working together, these systems 226 and 228 accept the media 308 and/or currency 302 within the BMAD 112, and move the media/currency as required to scan the media/currency for authentication purposes, to reject media/currency that cannot be authenticated, and to accept and store media/currency that has been authenticated.

The BMAD 112 maybe implemented with mechanical structures of varying design. For example, the magnetic sensors 222 can be physically scanned across the media 308 or currency 302, or can remain stationary while the media 308 or currency 302 is drawn across the magnetic sensors 222. One example of such structures is disclosed in U.S. Pat. No. 5,420,406, issued May 30, 1995 to Izawa et al., which application is hereby incorporated by reference herein.

Figure 4:
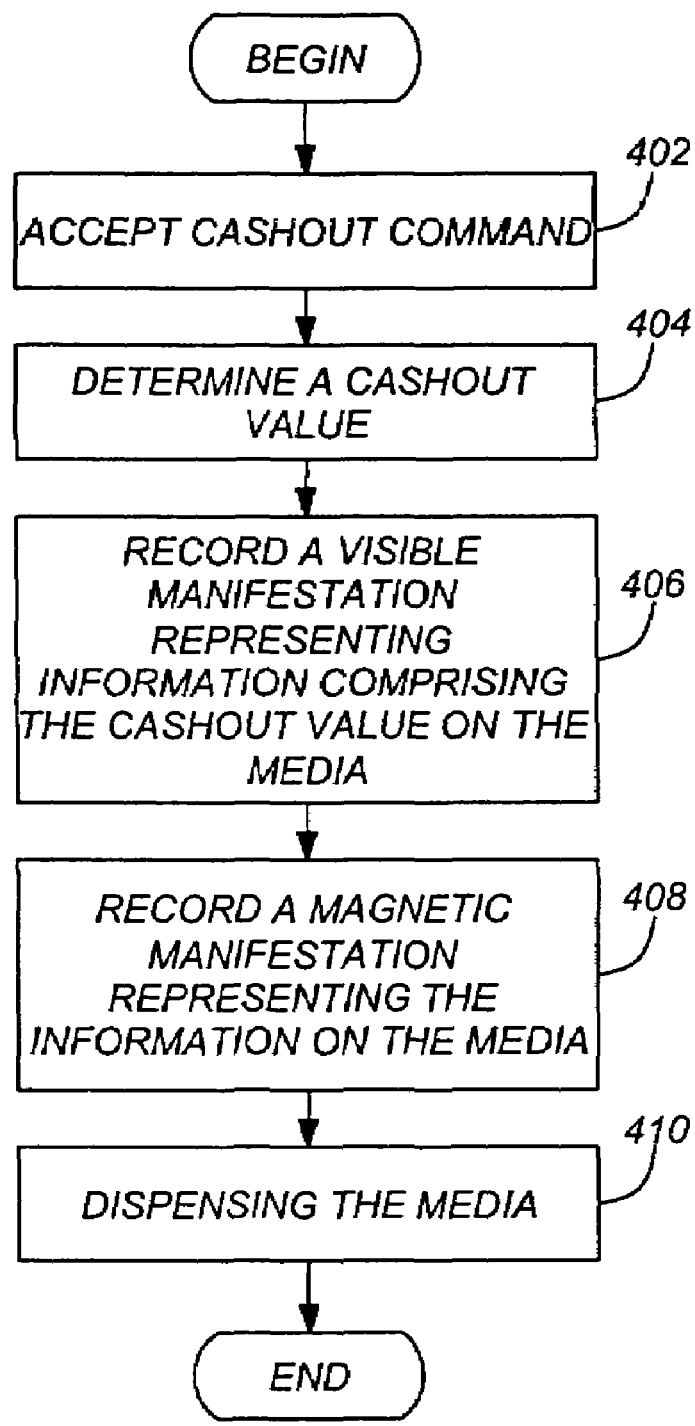
FIG. 4 is a flow chart presenting exemplary method steps used to dispense the self-authenticating media.

FIG. 4 is a flow chart presenting exemplary method steps used to practice one embodiment of the present invention. At some point, a player wagering on a first gaming device decides to cash out of the gaming device 102. Hereinafter, a letter designation "A" or "B" will be appended to reference numerals to indicate whether the element is present in the gaming device 102 issuing the media 308 (hereinafter referred to as the first gaming device 102A) or the gaming device 102 accepting the media 308 (hereinafter the second gaming device 102B). Similarly, elements in the first gaming device 102A and the second gaming device 102B are referred to with the "A" or "B" designation.

The player then provides an input to the first gaming device 102 such as a cashout command. The first gaming device 102A accepts 402 the cashout command, determines 404 the cashout value remaining on the first gaming device 102A. A visible manifestation of the cashout value is then recorded 406 on a media 308 in the BMAD 112 A. A magnetic manifestation representing the information is also recorded 408 on the media 308. The media 308 is then dispensed from the first gaming device 102A.

Figure 5:
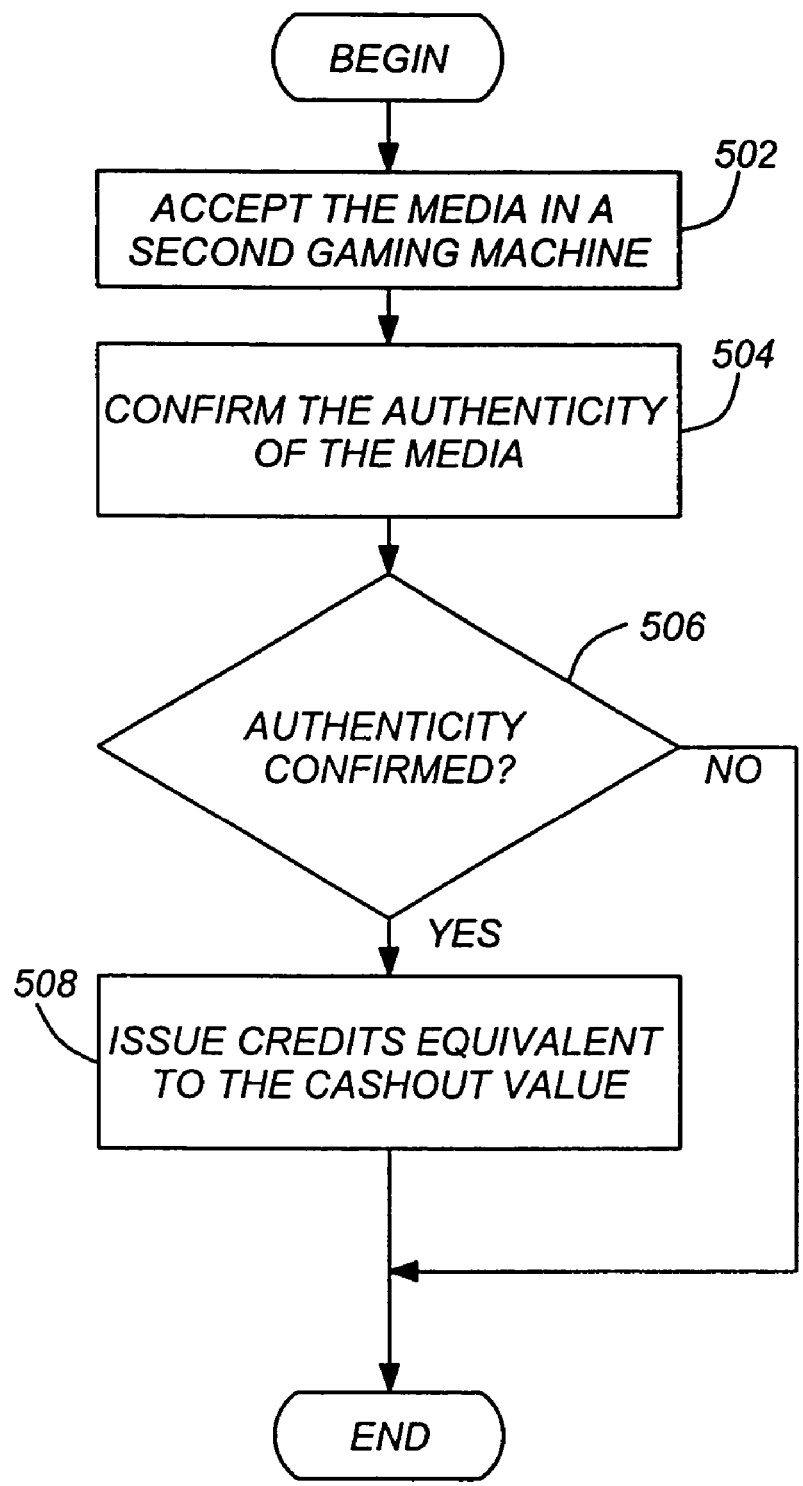
FIG. 5 is a flow chart presenting exemplary method steps used to accept and issue credits using the self-authenticating media.

FIG. 5 is a flow chart presenting illustrative process steps used to accept the media 308 in a second gaming device 102B. First, the user inserts the media into the BMAD 112B in the second gaming device 102B. The media 308 is accepted 502 into the second gaming device 102B. Operations are then performed to determine 504 the authenticity of the media. If the media is determined to be authentic, credits equivalent to the cashout value are issued 508 to the user by the second gaming device 102B.

Figure 6:
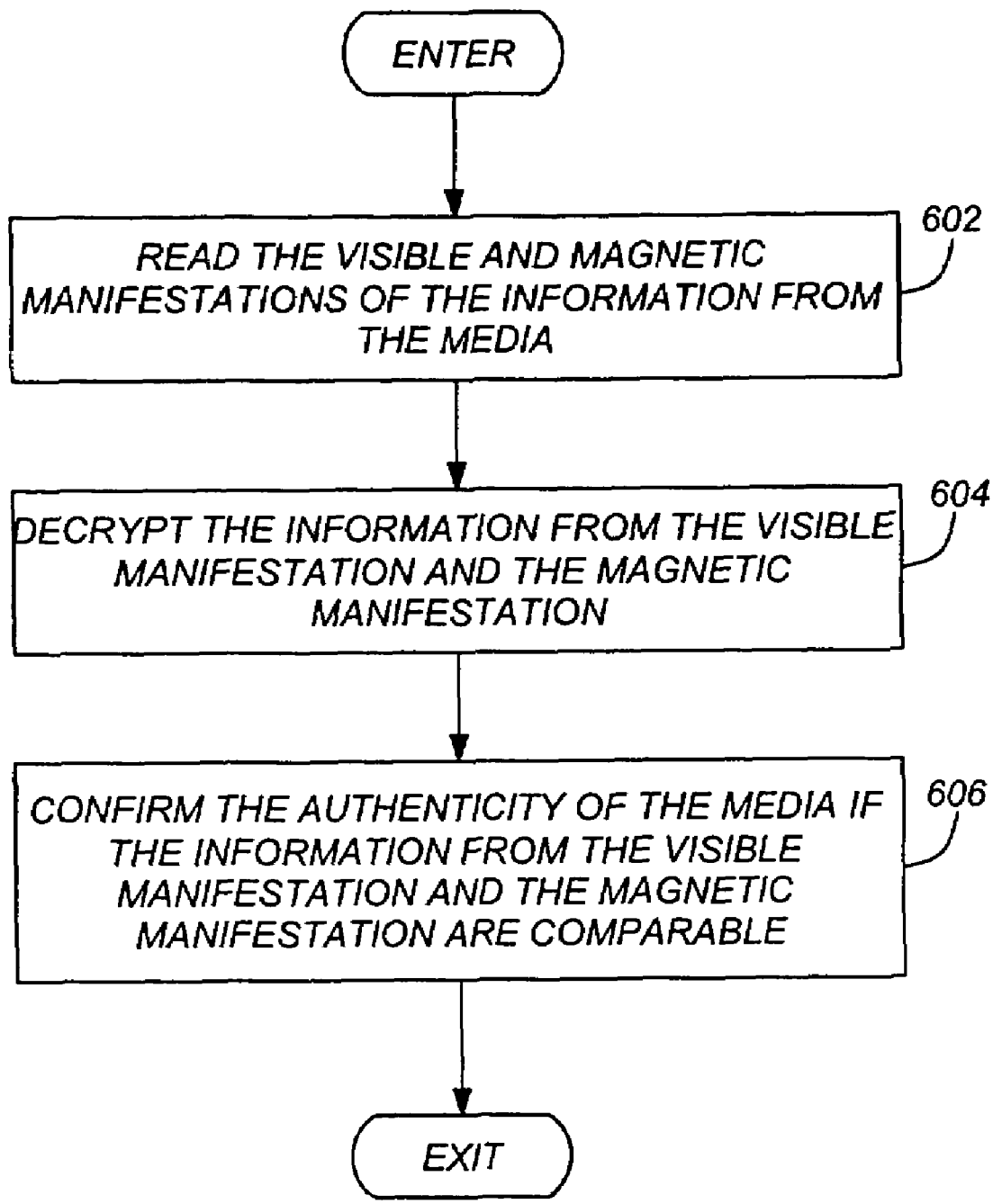
FIG. 6 is a flow chart presenting exemplary method steps used to confirm the authenticity of the self-authenticating media.

FIG. 6 is a flow chart presenting illustrative process steps used to confirm the authenticity of the media. First, the visible and magnetic manifestations of the information presented on the media 308 are read 602. This is accomplished with the optical sensors 218 and the magnetic sensors 222. Then, the information from the visible and magnetic manifestations is decrypted 604. If the information obtained from the visible and magnetic manifestations are comparable, the authenticity of the media 308 is confirmed. In embodiments where the same information is recorded in the visible and magnetic manifestations, a determination of comparability is made when the information is the same. In embodiments where the visible and magnetic manifestations include different information (including, for example different secret and perhaps time varying codes), a determination of comparability is made when the information matches were expected and differs where expected.

The visibly and manifested information includes the cash-out balance, but can include other information as well. For example, the information can include an identifier for the first gaming machine 102A. If desired, this identifier can be a secret code that is temporally inconstant over time (i.e. it can change at regular intervals as a function of time). Other secret codes can also be included in the information as well. The information may also include other information, such as the game play history for the player on the first gaming device 102A.

In one embodiment, the visibly and magnetically manifested information is the same. Hence, if one of the subsystems (either the printer 210 or the magnetic sensors 222) fails to visibly or magnetically imprint the desired information, the information will be manifested by the other system. In another embodiment, the visibly and magnetically manifested information at least partially differ from one another. This embodiment permits the media 308 to be authenticated by both the visibly and magnetically manifested information, thus increasing the security of the authentication process.

The information manifested on the media 308 can be encrypted by a key using an algorithm such as the data encryption standard (DES), Rivest-Shamir-Adleman (RSA). The key used to encrypt the information can be derived from information from the RTC 206. Since a key is required to decrypt the information when it is inserted into a second gaming device 102B, the second gaming device must have access to the key or a derivative thereof as well.

In prior art systems, the key used by the first gaming device 102A is transmitted to a central computer and database. After the media is inserted into the second gaming device 102B, the key is retrieved from a central database, and used to decrypt the encrypted information.

In the present invention, however, the key is not transmitted from the first gaming device 102A to the second gaming device 102B at all. Instead, the key is inferred from the current time, as determined by each of the gaming devices 102 using the real time clock 206 in each individual gaming device 102. Therefore, the key used by the first gaming device 102B is derived from the real time clock 206 in the first gaming device.

Figure 7:
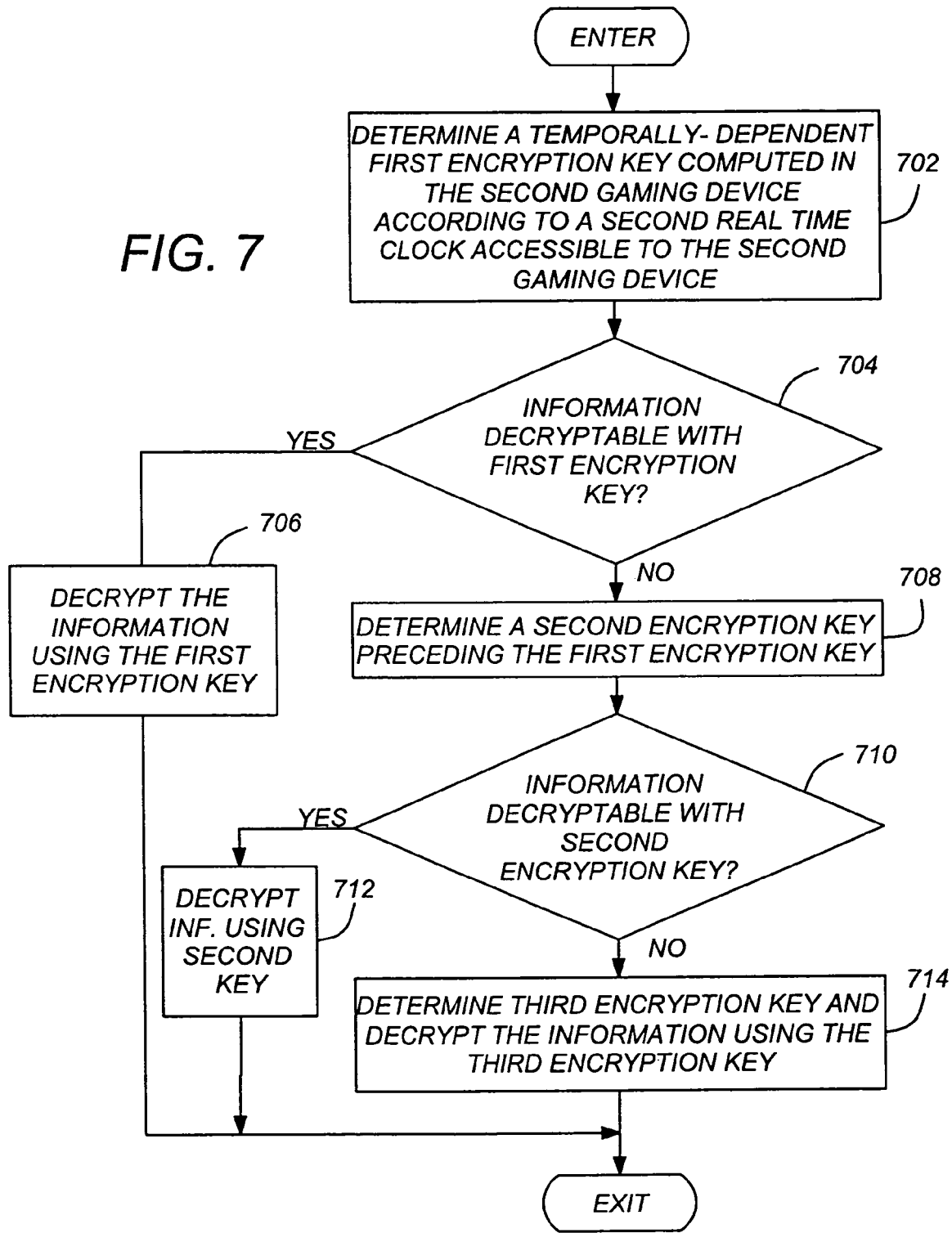
FIG. 7 is a flow chart presenting exemplary method steps used to decrypt the information presented in the self-authenticating media.

FIG. 7 is a flow chart presenting exemplary method steps used to decrypt the information from the visible and magnetic manifestations on the media 308. As described above, one embodiment of the present invention relies on the fact that each of the gaming devices having a common base (such as the time of day) from which encryption keys are determined. Although each of the gaming devices 102 are not in communication with one another, the common base allows each of the gaming devices to independently determine the value of the encryption key at any particular time.

For example, before the information is impressed on the media 308, it may be encrypted with an encryption key, which can be derived from information from the RTC 206A. For example, the equation (1) (wherein the function frc(•) indicates the fractional remainder of the argument (•))could be used to derive the key from the TimeofDay obtained from the real time clock 206A.

$$\text{Key} = \left[ \text{frc}\left(\pi + \left(\frac{TimeofDay}{99999999999}\right)\right)^5 \right] \quad \text{Equation (1)}$$

The key can change at any rate. For example, the key can change daily. In this case, the key may be defined as follows:

$$\text{Key} = \left[ \text{frc}\left(\pi + \left(\frac{Date}{99999999999}\right)\right)^5 \right] \quad \text{Equation (2)}$$

To decrypt the information manifested on the media 308, the encryption key must be available to the second gaming device 102B. This can be effected using the real time clock 206B in the second gaming device 102B.

Considering the case where the key is computed from the date (or a value determinable therefrom), so long as media 308 was dispensed from the first gaming device 102A and inserted into the second gaming device 102B on the same date, the encryption key can be determined directly, since the clocks of the first gaming device 102A and the second gaming device 102B should indicate the same date and time to within a reasonable tolerance, even over significant periods of time. In cases where the media 308 was dispensed from the first gaming device 102A late in the day (at 11:30 PM, for example) and inserted in the second gaming device early the next day 102B (at 12:30 AM, for example), the key used by the first gaming device will be different than the current key in the second gaming device 102B. In such cases, the second gaming device 102B also examines the key for the previous period (in this case, a day) and for the subsequent period if necessary. Further, to account for the fact that the RTC 206A in the first gaming device 102A will generally not be precisely synchronized with the RTC 206B in the second gaming device 102B, the second gaming device can also consider keys for days preceding the previous day, and days following the following day. Further, after the second gaming device 102B has successfully decrypted the information manifested on the media 308, the second gaming device 102B can examine the information (which may include the time the media 308 was issued from the first gaming device 102B), and use this information to make a further determination regarding whether game credits should be issued at the second gaming device 102B.

Figure 8:
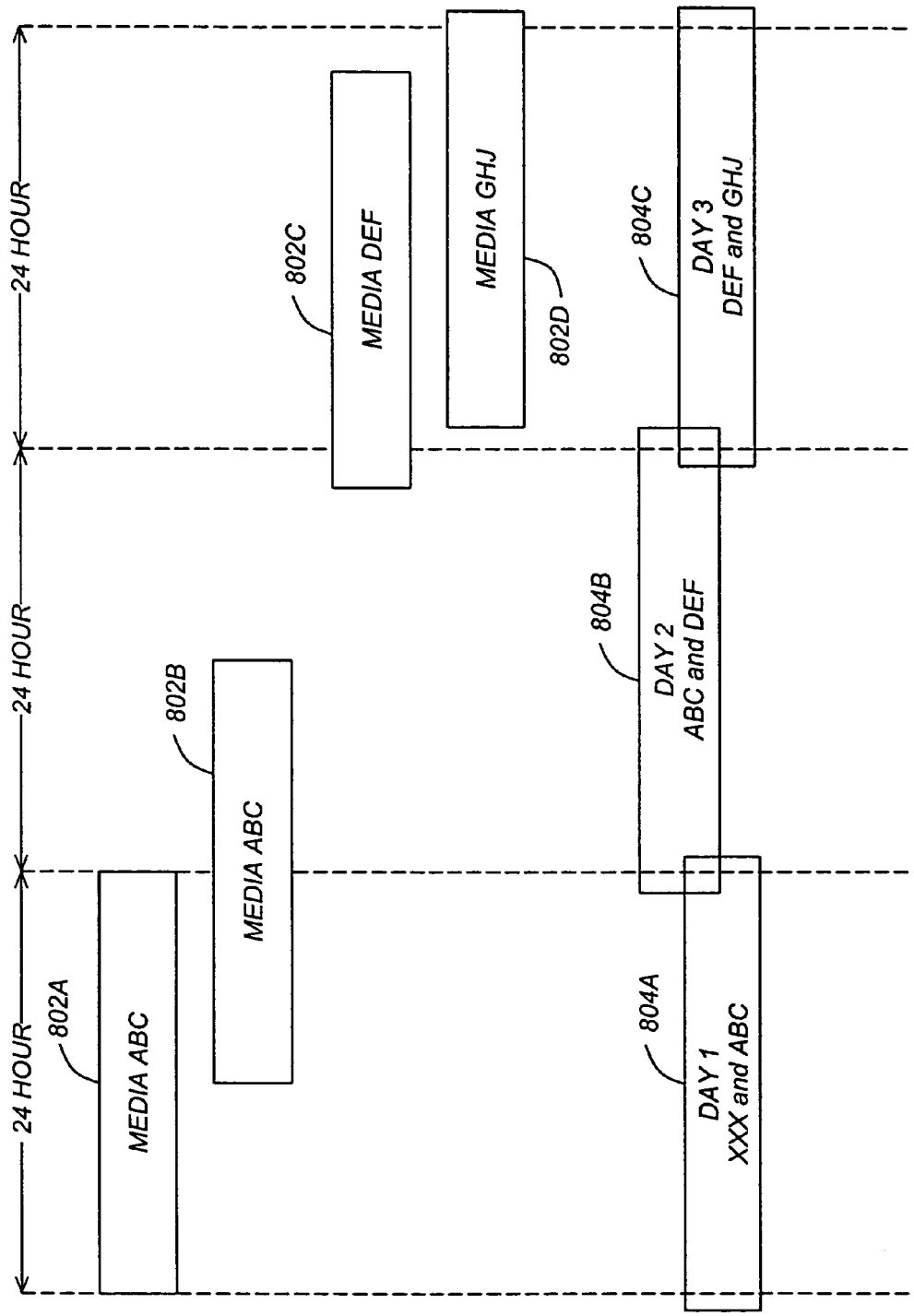
FIG. 8 is a diagram illustrating the use of the temporally-dependent encryption keys.

FIG. 8 is a diagram illustrating the temporally-dependent encryption keys. Block 802A illustrates the issuance of media 308 at the beginning encrypted according to encryption key "ABC" during the first 24 hour period. In this embodiment, the media 308 is valid for 24 hours. Hence, at the end of the first 24 hour period and the beginning of the second 24 hour period, the voucher becomes inactive.

Block 802B illustrates the issuance of media 308 encrypted according to the encryption key "ABC" during the first 24 hour period. As illustrated, the media is valid for 24 hours, extending into the second 24 hour period Block 802C illustrates the issuance of media 308 encrypted according to encryption key "DEF" during the second 24 hour period and block 802D illustrates the issuance of media 308 encrypted according to the encryption key "GHJ" during the third 24 hour period. In the foregoing example, the media is valid 24 hours and is accepted on the day issued and for the following day until 24 hours have elapsed.

Beginning 30 minutes before the first 24 hour period and extending 30 minutes from the end of the first 24 hour period (for a total of 25 hours), the second gaming device 102B considers two encryption keys in attempting to accept the media. As illustrated in block 804A of FIG. 8, these keys include "XXX" (the key from the previous 24 hours), the "ABC" key. Beginning 30 minutes before the second 24 hour period and extending 30 minutes from the end of the second 24 hour period (for a total of 25 hours), the second gaming device considers the "ABC" and "DEF" encryption keys in attempting to accept the media 308. Similarly, from the time beginning 30 minutes prior to the beginning of the third 24 hour period and extending 30 minutes after the third 24 hour period, the second gaming device 102B considers the "DEF" and "GHJ" encryption keys.

Turning again to FIG. 7 a temporally-dependent first encryption key computed in the second gaming device 102B is determined 702 according to a clock accessible to the second gaming device 102B, such as RTC 206B. As described above, temporal dependence refers to the fact that the value of each key depends on a temporally-changing value (that is the time of day or the date). The ordered series of encryption keys can be pre-computed and directly stored in the second gaming device, or can be determined when the media 308 is inserted into the gaming device 102B by determining the key from the time of day, as is described further below.

If the information manifested on the media 308 is decryptable with the first decryption key, the information is decrypted, as shown in blocks 704 and 706. If not, a second encryption key temporally preceding the first encryption key is determined, as shown in block 708. If the information is decryptable with the second encryption key, the information is decrypted, as shown in block 710 and 712. If not, a third encryption key following first encryption key is determined and used to decrypt the information, as shown in block 714.

Figure 9:
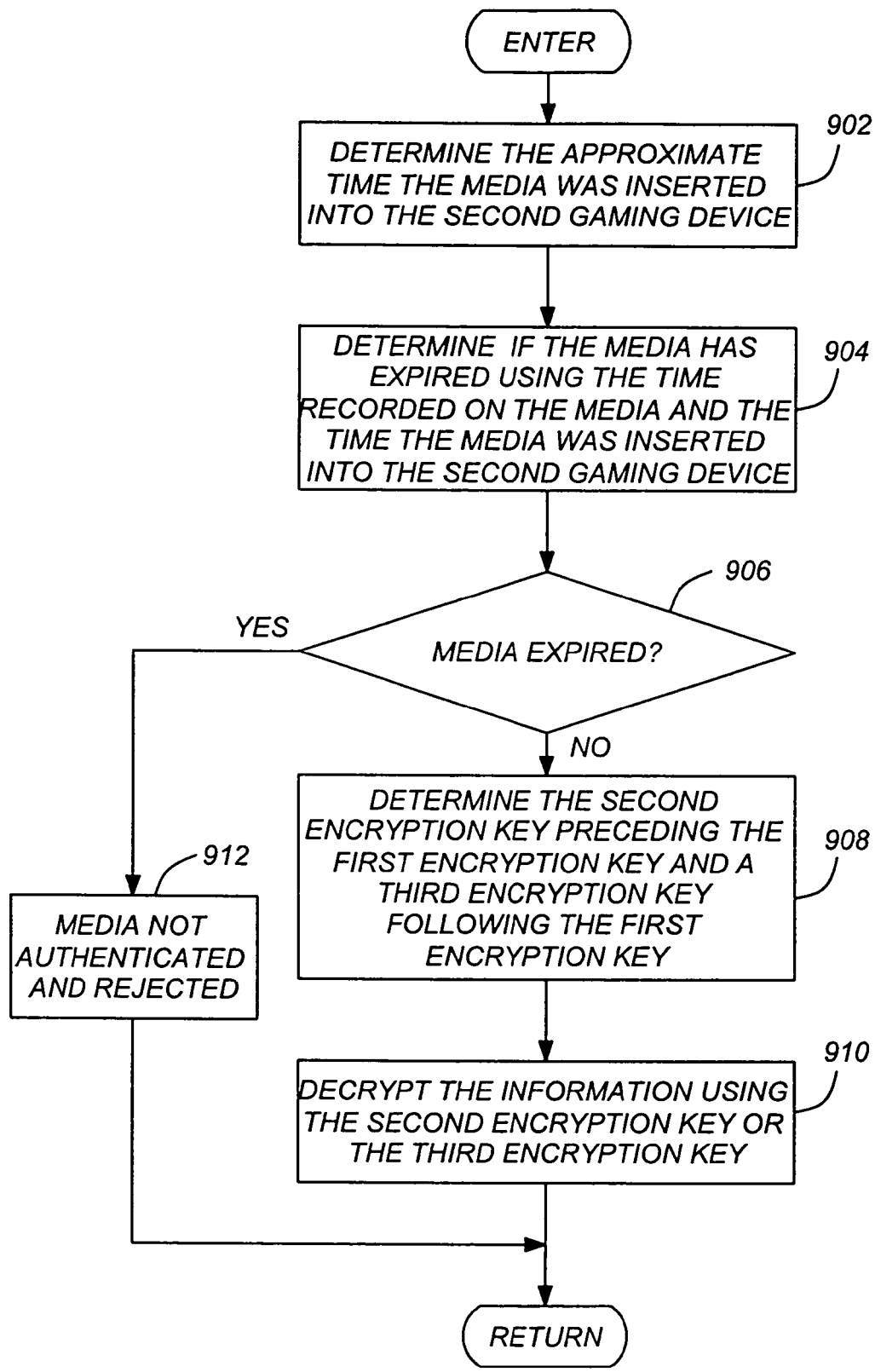
FIG. 9 is a flow chart presenting further exemplary method steps used to decrypt the information presented in the self-authenticating media.

FIG. 9 is a flow chart showing exemplary method steps used to decrypt the information presented in the self-authenticating media 308. First, the approximate time the media was inserted into the second gaming device 102B is determined 902. Then, a determination is made as to whether the media has expired using the time recorded on the media and the time the media was inserted into the second gaming device 102B, as shown in block 904. If the media has expired (for example, the media was issued from the first gaming device 102A more than 24 hours ago), the media is not authenticated, and is rejected, as shown in block 906 and 912. If the media has not expired, a second encryption key temporally preceding the first encryption key and a third encryption key temporally following the first encryption key is determined 908 and used to decrypt the information, as shown in blocks 908 and 912.

CONCLUSION

A method, apparatus, and article of manufacture for dispensing pre-coded scrip is disclosed. The method comprises the steps of determining a cashout value in response to a cashout command, recording a visible manifestation representing information comprising the cashout value on a media, recording a magnetic manifestation representing the information on the media and dispensing the media from the first gaming machine.

In one embodiment, the apparatus comprises a self-authenticating media usable in transferring credits from a first gaming machine to a second gaming machine. The media comprises a bottom surface, suitable for application of print media, a heat-sensitive top surface, suitable for manifesting printed media by a thermal printer, a re-recordable continuous magnetic media portion, embedded within the media between the bottom surface and the top surface, the magnetic media portion suitable for recording, playing back, and erasing a continuously variable magnetic field by a magnetic head, wherein the magnetic media portion is substantially undetectable by reflective optical sensors and substantially detectable by densometric optical sensors.

In another embodiment, the apparatus comprises a printing device for applying printed media to a heat sensitive top surface of the self-authentication media, a processor, communicatively coupled to the printing device and a memory, a magnetic head, and a magnetic media subsystem communicatively coupled to the processor and the magnetic head, the magnetic media subsystem selectable configurable to authenticate currency via magnetic ink printed on the currency and to read a magnetic manifestation representing information comprising a cashout value on a re-recordable continuous magnetic media portion embedded within the self-authenticating media.

This system relies on coupons or scrip cards that are inherently worthless and self-authenticating. These coupons are activated and dispensed to the user when a payout is requested, and permanently deactivated when they are re-inserted into a gaming device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the details of the embodiments presented in this description. The above specification, examples, and data provide a complete description of the manufacture and use of the invention. Many embodiments of the invention can be made without departing from the spirit and scope of the invention.

What is claimed is:

1. A method of dispensing a self-authenticating media useable in transferring credits from a first gaming device to a second gaming device, comprising the steps of:
   determining a cashout value in response to a cashout command;
   recording a visible manifestation representing information comprising the cashout value on a media;
   recording a magnetic manifestation representing the information on the media;
   dispensing the media from the first gaming device;
   accepting the media in the second gaming device;
   confirming the authenticity of the media, comprising the steps of
      reading the visible and magnetic manifestations of the information from the media;
      decrypting the information from the visible manifestation and the magnetic manifestation;
      confirming the authenticity of the media if the information from the visible manifestation and the magnetic manifestation are comparable; and
      issuing credits equivalent to the cashout value after the authenticity of the media is confirmed.

2. The method of claim 1, wherein the magnetic manifestation of the information is continuously variable.

3. The method of claim 1, wherein the visible manifestation of the information is recorded on a heat-sensitive top surface of the self-authenticating media.

4. The method of claim 1, wherein the magnetic manifestation of the information is recorded on a magnetic media portion embedded between a bottom surface of the media and a top surface of the media.

5. The method of claim 1, wherein the magnetic media portion is substantially undetectable by a reflective optical sensor and substantially detectable by a densometric sensor.

6. The method of claim 1, wherein the visible manifestation and the magnetic manifestation of the information are recorded in the same area of the media.

7. The method of claim 1, further comprising the steps of:
determining that one of the manifestations of the information on the media has failed to be recorded, the manifestation selected from the visible manifestation and the magnetic manifestation; and
determining the cashout value from the recorded manifestation of the information.

8. The method of claim 1, wherein:
the visibly and magnetically manifested information is encrypted according to a first encryption key that is temporally-dependent and, wherein the step of decrypting the information comprises the steps of:
determining a temporally-dependent first encryption key computed in the second gaming device; and
decrypting the information using the temporally-dependent first encryption key computed in the second gaming device.

9. The method of claim 8, further comprising the steps of:
determining a second encryption key temporally preceding the first encryption key and a third encryption key temporally following the first encryption key; and
decrypting the information using the second encryption key and the third encryption key if the information cannot be decrypted using the first encryption key.

10. The method of claim 9, wherein the second encryption key immediately precedes the first encryption key and the third encryption key immediately precedes the second encryption key.

11. The method of claim 9, wherein the information recorded in the visible manifestation and the magnetic manifestation further comprises an approximate time that the media is dispensed from the first gaming device.

12. The method of claim 11, further comprising the steps of:
determining the approximate time the media was inserted into the second gaming device; and
determining if the media has expired using the time recorded on the media and the time the media was inserted into the second gaming device; and
if the media has not expired, selecting a second encryption key preceding the first encryption key and a third encryption key following the first encryption key according to the time of day recorded on the media, and decrypting the information using the second encryption key and the third encryption key if the information cannot he decrypted using the first encryption key.

13. The method of claim 1, wherein the information further comprises an identification of the first gaming device.

14. The method of claim 1, wherein the information further comprises a theft code.

15. A self-authenticating media useable in transferring credits from a first gaming device to a second gaming device, comprising:
a bottom surface, suitable for application of print media;
a top surface, suitable for manifesting printed media;
a continuous magnetic media portion, embedded within the media between the bottom surface and the top surface, the magnetic media portion suitable for recording, playing back, and erasing a continuously variable magnetic field by a magnetic head;
wherein the magnetic media portion is substantially undetectable by reflective optical sensors and substantially detectable by densometric optical sensor.

16. The media of claim 15, wherein the magnetic media portion comprises a polyethelene stripe having magnetizable particles.

17. The media of claim 15, wherein the magnetic media portion comprises a magnetic track.

18. The media of claim 15, wherein the bottom surface comprises pre-printed information.

19. The media of claim 15, wherein the media is of substantially the same dimension as currency so as to be acceptable within a currency acceptor.

20. The media of claim 15, wherein the currency acceptor comprises a magnetic head for reading magnetic patterns manifested by magnetic ink printed on the currency, and wherein the magnetic media portion is disposed within the media so as to be readable by the magnetic head.

21. The media of claim 15, further comprising:
a visible manifestation disposed on the top surface, representing information comprising a media cashout value;
a magnetic manifestation on the magnetic media portion, representing the information.

22. The media of claim 21, wherein the information representing the media cashout value is encrypted.

23. The media of claim 22, wherein the visible manifestation and the magnetic manifestation representing the information are at least partially redundant.

24. The media of claim 15, wherein the visible manifestation and the magnetic manifestation are disposed in the same area of the media.

25. The media of claim 15, wherein the magnetic media portion is substantially undetectable by a reflective optical sensor and substantially detectable by a densometric optical sensor.

26. An apparatus for dispensing and receiving a self-authenticating media usable in transferring credits from a first gaming device to a second gaming device, comprising:
a printing device for applying printed media to a top surface of the self-authenticating media;
a processor, communicatively coupled to the printing device and a memory;
a magnetic head; and
a magnetic media subsystem communicatively coupled to the processor and the magnetic head, the magnetic media subsystem selectably configurable to authenticate currency via magnetic ink printed on the currency and to read a magnetic manifestation representing information comprising a cashout value on a re-recordable continuous magnetic media portion embedded within the self-authenticating media.

27. The apparatus of claim 26, wherein the magnetic manifestation is continuously variable.

28. The apparatus of claim 26, wherein the visible manifestation of the information is recorded on the top surface of the self-authenticating media.

29. The apparatus of claim 26, wherein the apparatus further comprises:
a reflective optical sensor, communicatively coupled to the processor, for reading a visible manifestation representing information comprising a cashout value on the media.

30. The apparatus of claim 29, wherein the apparatus further comprises a densometric optical sensor, and the magnetic media portion is substantially undetectable by the reflective optical sensor and substantially detectable by the densometric optical sensor.

31. The apparatus of claim 26, wherein the visible manifestation and the magnetic manifestation of the information are disposed in the same area of the media.

32. The apparatus of claim 26, wherein the visibly and magnetically manifested information is encrypted according to a first encryption key.

33. The apparatus of claim 32, wherein:
the apparatus further comprises a real time clock; and
the first encryption key is temporally selected from an ordered series of encryption keys computed according to the real time clock.

34. The apparatus of claim 33, further comprising decryption module having a plurality of instructions stored in the memory for instructing the processor to decrypt the information to confirm the authenticity of the media.

35. An apparatus for dispensing a self-authenticating media useable in transferring credits from a first gaming device to a second gaming device, comprising:
means for determining a cashout value in response to a cashout command;
means for recording a visible manifestation representing information comprising the cashout value on a media;
means for recording a magnetic manifestation representing the information on the media;
means for dispensing the media from the first gaming device;
means for accepting the media in the second gaming device;
means for confirming the authenticity of the media, comprising
means for reading the visible and magnetic manifestations of the information from the media;
means for decrypting the information from the visible manifestation and the magnetic manifestation;
means for confirming the authenticity of the media if the information from the visible manifestation and the magnetic manifestation are comparable; and
means for issuing credits equivalent to the cashout value after the authenticity of the media is confirmed.

36. The apparatus of claim 35, wherein the magnetic manifestation of the information is continuously variable.

37. The apparatus of claim 35, wherein the visible manifestation of the information is recorded on a heat-sensitive top surface of the self-authenticating media.

38. The apparatus of claim 35, wherein the magnetic manifestation of the information is recorded on a magnetic media portion embedded between a bottom surface of the media and a top surface of the media.

39. The apparatus of claim 35, wherein the magnetic media portion is substantially undetectable by a reflective optical sensor and substantially detectable by a densometric sensor.

40. The apparatus of claim 35, wherein the visible manifestation and the magnetic manifestation of the information are recorded in the same area of the media.

41. The apparatus of claim 35 further comprising:
means for determining that one of the manifestations of the information on the media has failed to be recorded, the manifestation selected from the visible manifestation and the magnetic manifestation; and
means for determining the cashout value from the recorded manifestation of the information.

42. The apparatus of claim 35, wherein:
the visibly and magnetically manifested information is encrypted according to a first encryption key that is temporally-dependent, and wherein the means for decrypting the information comprises
means for determining a temporally-dependent first encryption key computed in the second gaming device; and
means for decrypting the information using the temporally-dependent first encryption key computed in the second gaming device.

43. The apparatus of claim 42, further comprising:
means for determining a second encryption key temporally preceding the first encryption key and a third encryption key temporally following the first encryption key; and
means for decrypting the information using the second encryption key and the third encryption key if the information cannot be decrypted using the first encryption key.

44. The method of claim 43, wherein the second encryption key immediately precedes the first encryption key and the third encryption key immediately precedes the second encryption key.

45. The method of claim 43, wherein the information recorded in the visible manifestation and the magnetic manifestation further comprises an approximate time that the media is dispensed from the first gaming device.

46. The apparatus of claim 45, further comprising:
means for determining the approximate time the media was inserted into the second gaming device; and
means for determining if the media has expired using the time recorded on the media and the time the media was inserted into the second gaming device; and
if the media has not expired, selecting a second encryption key preceding the first encryption key and a third encryption key following the first encryption key according to the time of day recorded on the media, and decrypting the information using the second encryption key and the third encryption key if the information cannot be decrypted using the first encryption key.

47. The apparatus of claim 35, wherein the information further comprises an identification of the first gaming device.

48. The apparatus of claim 35, wherein the information further comprises a theft code.

* * * * *